(12) United States Patent
Switkes et al.

(10) Patent No.: US 11,919,516 B2
(45) Date of Patent: Mar. 5, 2024

(54) SYSTEMS AND METHODS FOR PLATOONING

(71) Applicant: Peloton Technology, Inc., Mountain View, CA (US)

(72) Inventors: Joshua P Switkes, Mountain View, CA (US); Stephen Erlein, Mountain View, CA (US); Trevor Laing, San Jose, CA (US); Austin Schuh, Los Altos, CA (US)

(73) Assignee: Peloton Technology, Inc., Mountain View, CA (US)

( * ) Notice: Subject to any disclaimer, the term of this patent is extended or adjusted under 35 U.S.C. 154(b) by 472 days.

(21) Appl. No.: 16/384,824

(22) Filed: Apr. 15, 2019

(65) Prior Publication Data
US 2020/0324768 A1 Oct. 15, 2020

(51) Int. Cl.
*B60W 30/165* (2020.01)
*B60W 30/16* (2020.01)
*B60W 50/08* (2020.01)
*G08G 1/00* (2006.01)

(52) U.S. Cl.
CPC ........ *B60W 30/165* (2013.01); *B60W 30/162* (2013.01); *B60W 50/082* (2013.01); *G08G 1/202* (2013.01)

(58) Field of Classification Search
CPC ............ B60W 30/165; B60W 50/082; B60W 30/162; G08G 1/202; G08G 1/22
See application file for complete search history.

(56) References Cited

U.S. PATENT DOCUMENTS

| | | | | |
|---|---|---|---|---|
| 7,554,435 | B2 * | 6/2009 | Tengler | B60Q 1/44 340/425.5 |
| 7,593,811 | B2 * | 9/2009 | Schmidt | G05D 1/0278 701/300 |
| 2006/0195250 | A1 * | 8/2006 | Kawaguchi | G08G 1/161 701/117 |
| 2018/0050697 | A1 * | 2/2018 | Kuszmaul | G08G 1/22 |
| 2018/0082591 | A1 * | 3/2018 | Pandy | B60W 10/18 |
| 2019/0129447 | A1 * | 5/2019 | Tulpule | G05B 13/042 |
| 2019/0299989 | A1 * | 10/2019 | Tulpule | B60W 30/16 |
| 2019/0375407 | A1 * | 12/2019 | Maleki | B60W 10/04 |
| 2020/0168102 | A1 * | 5/2020 | Kamata | G05D 1/0295 |
| 2020/0282990 | A1 * | 9/2020 | Sato | B60W 60/0054 |
| 2020/0301444 | A1 * | 9/2020 | Sujan | B60W 30/165 |

* cited by examiner

*Primary Examiner* — Nadeem Odeh
(74) *Attorney, Agent, or Firm* — Redbrick IP, P.C.

(57) ABSTRACT

Systems and methods for platooning using aspects of various cruise control systems are described. In one aspect, a platooning system may cause an engine to provide a desired amount of torque by commanding a cruise control system to cause an amount of torque provided by the engine to be limited. In one aspect, a platooning system may cause a platoon to end in response to the detection of a condition that would cause a cruise control system to exit a cruise control state, such as pressing a brake pedal.

17 Claims, 11 Drawing Sheets

SYSTEMS AND METHODS FOR PLATOONING

BACKGROUND

Enabling a vehicle to follow closely behind one vehicle safely through partial or full automation has significant fuel savings, safety, and/or labor savings benefits, but is generally unsafe when a driver tries to do this manually. Presently, during normal driving, vehicle motion is controlled either manually, by a driver, or by convenience systems, such as cruise control or adaptive cruise control. The various types of cruise control systems control vehicle speed to make driving more pleasurable or relaxing, by partially automating the driving task. Some of these systems use range sensors and/or vehicle sensors to control the speed to maintain a constant headway relative to the leading vehicle (also referred to herein as a front vehicle). In general, these cruise control systems provide minimal added safety, and do not have full control of the vehicle (in terms of being able to fully brake or accelerate).

Driver control does not match the safety performance of even current systems, for several reasons. First, a driver cannot safely maintain a close following distance. In fact, the relatively short distances between vehicles necessary to get any measurable fuel savings results in an unsafe condition if the vehicle is under driver control, thereby risking a costly and destructive accident. Further, the driver is not as capable of maintaining an optimal headway as an automated system is. In fact, a driver trying to maintain a constant headway often causes rapid and large changes in command (accelerator pedal position for example), resulting in a loss of efficiency.

Thus, it would be desirable to have reliable, safe, and economical semi-automated vehicular convoying/platooning systems which enable vehicles to follow closely together in a safe, efficient, convenient manner. Of course, where possible, it may be advantageous for a first system in a vehicle to utilize attributes of another system within a vehicle to increase the safety, effectiveness, and other attributes required by that first system.

SUMMARY

The systems and methods comprising various aspects of the disclosure described herein provide for safety and engine controls via cruise control systems and platooning systems.

In one aspect, without limitation, a method for controlling a vehicle is described. Such a method may cause a wireless data link to be established between two or more vehicles. A platooning system may be included in the two or more vehicles, such as a front vehicle and a rear vehicle. The method may cause a platooning system in a rear vehicle to receive information from a cruise control system, or vice versa. For example, a platooning system may cause a cruise control system to cause an engine to produce a certain amount of torque. As another example, a cruise control system may cause a platooning system to end a platoon.

In still another aspect, without limitation, a system including a platooning electronic control unit and a cruise control electronic control unit may cause a first vehicle and a second vehicle to platoon. In various examples, a cruise control electronic control unit in a vehicle may provide information to a platooning electronic control unit, and/or a platooning electronic control unit may receive information from a cruise control electronic control unit. For example, a cruise control electronic control unit may provide a platooning electronic control unit with information that causes a platoon to dissolve (such as information indicating cruise control should be stopped).

As another example, a platooning electronic control may provide a cruise control system with a desired amount of torque, and based on that desired amount of torque the cruise control system may then command the amount of torque to be provided by an engine (e.g., by at least in part causing an amount of torque provided by the engine to be limited).

It will be appreciated by those skilled in the art that the various features of the present disclosure can be practiced alone or in combination.

These and other features of the present disclosure will be described in more detail below in the detailed description of the disclosure and in conjunction with the following figures.

BRIEF DESCRIPTION OF THE DRAWINGS

In order to describe the various aspects of the present disclosure, some detailed description now will be provided, by way of illustration, with reference to the accompanying drawings, in which.

DETAILED DESCRIPTION

Figure 1:
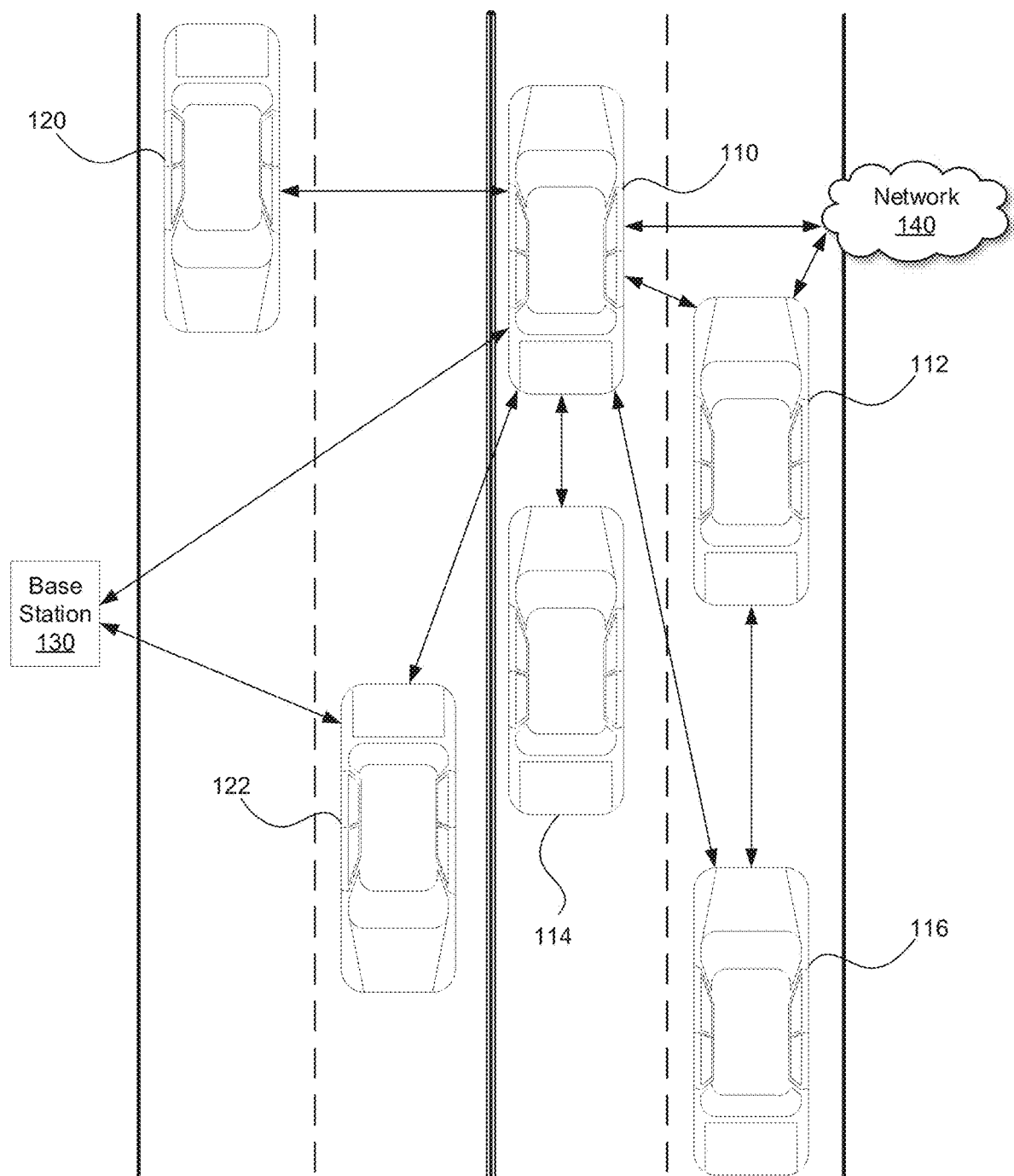
FIG. 1 illustrates a diagram of a platooning system, in accordance with some embodiments.

The present invention will now be described in detail with reference to several embodiments thereof as illustrated in the accompanying drawings. In the following description, numerous specific details are set forth in order to provide a thorough understanding of embodiments of the present invention, including the description of a plurality of different aspects of the invention, including, in some cases, one or more alternatives. It will be apparent to those skilled in the art that the invention can be practiced without implementing all of the features disclosed herein. Further, although many embodiments included in the instant application are related to the concept of platooning, it should be appreciated that many broader applications are envisioned.

Without limitation, the Applicant has proposed various vehicle platooning systems in which a second, and potentially additional, vehicle(s) is/are automatically, or semi-automatically controlled to closely follow a lead/front vehicle in a safe manner. In various embodiments, front and/or rear vehicles may operate at any of the six "Levels of Driving Automation" described in SAE's J3106 standard.

U.S. patent application Ser. Nos. 15/605,456, 15/607,902; 13/542,622 and 13/542,627; U.S. Provisional Patent Application Nos. 61/505,076, 62/377,970 and 62/343,819; and PCT Patent Application Nos. PCT/US2014/030770, PCT/US2016/049143, PCT/US2018/41684, and PCT/US2016/060167 describe various vehicle platooning systems in which a trailing vehicle (also referred to herein as a rear vehicle) is at least partially controlled to closely follow a designated lead vehicle. Each of these earlier applications are incorporated herein by reference.

One of the goals of platooning is typically to maintain a desired gap between the platooning vehicles and/or a desired relative speed and/or time headway (e.g., a gap may refer to a distance, a headway, or both). Thus, it should be appreciated that, herein, unless otherwise stated, any reference to the term "gap" could refer to a distance, a headway, or both. Further, while the term "maintain" is used throughout this disclosure, maintaining may mean staying within a gap (distance/headway), staying at a gap, and/or keeping at within least a certain gap. Further, a desired gap may include a relative distance, time headway, and/or angle/offset. A longitudinal distance and/or time headway is frequently referred to herein as a "target gap". That is, it is desirable for the trailing vehicle (e.g., a rear vehicle) to maintain a designated gap relative to a specific vehicle (e.g., a lead vehicle). The vehicles involved in a platoon will typically have sophisticated control systems suitable for initiating a platoon, maintaining the gap under a wide variety of different driving conditions, and gracefully dissolving (e.g., ending) the platoon as appropriate. It should be appreciated that herein, a gap may refer to a distance, a time headway, or either.

As described herein, the concept of platooning, also known as convoying, is still in its infancy. Academics have toyed with the concept over the last few decades, but to date there are no commercial systems on the road where a vehicle is at least partially controlled by another vehicle via a vehicle-to-vehicle connection (V2V). The benefits provided by such systems are obvious. Namely, the safety provided by these systems is far greater than a system where a rear vehicle doesn't begin to slow down until its radar or LIDAR sensors determine that a lead vehicle is slowing down, such as with some adaptive cruise control systems. Further, by being able to follow another vehicle at a close distance, in some cases both a rear vehicle and a front vehicle may experience significant fuel savings.

As platoonable vehicles (e.g., vehicles capable of platooning or any type of following based on V2V communication, whether directly following each other, offset in different lanes, and/or with one or more vehicles between them) begin to roll out of the labs and into commercial production, their adoption faces significant challenges. For example, systems must be safe, effective, and may occasionally implement features of other vehicle systems increase efficiency and/or safety. In some embodiments, two systems may be considered to be different systems if they can operate independently of one another. For instance, a platooning system may be independent of a cruise control system if the cruise control system can operate independently of the platooning system, or vice-versa.

In example of one vehicle system implementing features of another vehicle system, a platooning system can transmit data to a cruise control system, and in response, that cruise control system may command engine torque based on the data transmitted by the platooning system. By utilizing the cruise control system, the platooning system may cause a request for an amount of torque which is then limited, and used to maintain a gap between two platooning vehicles. As another example of one vehicle system using another vehicle system, a platooning system may receive data from a cruise control system indicating cruise control should disengage, and in response the platooning system may cause a platoon to dissolve.

Generally speaking, various cruise control systems such as generic (or normal) cruise control systems (CC), adaptive cruise control systems (ACC), and predictive cruise control systems (PCC) operate by requesting an amount of torque from a motor and/or engine. Herein, motors (typically used in electric/hybrid cars) and engines (such as internal combustion engines) may be used interchangeably when referring to a component that generates power to deliver to a road surface. In some embodiments, it is contemplated that other components may propel a vehicle other than an electric motor or internal combustion engine, and those components may be used instead of motors and/or engines as described herein. Also, the word torque may, in some embodiments, be used synonymously with power or force, or other words that indicate the immediate motive force applied by the vehicle.

Typically, in an ACC system, an engine electronic control unit (an EECU) determines an amount of torque necessary/ desired to achieve a speed, and a radar (e.g., a forward-looking radar (FLR)) may cause the ACC system to limit an amount of torque provided to avoid encroachment on a preceding vehicle, thereby achieving and not overshooting a desired speed. So, for instance, an ACC system may request 100% of an amount of torque available to request, and the ACC system (and/or at least a portion of another system) may limit that amount such that only 80% of the available torque is provided in order for the desired speed to be achieved. Thus, as should be clear to one skilled in the art, limiting an amount of torque by a cruise control system is meant to control vehicle speed.

Herein, various platooning systems are described which request a maximum amount of torque, which is them limited based on a desired gap. By aiming to control and/or command torque to achieve a gap without considering speed, a platooning system can maintain a gap much better than by attempting to achieve a speed. While ACC causes a vehicle to travel at a specific speed regardless of whether another vehicle is in front of it, systems herein operate (e.g., only) when another vehicle is in front of the rear vehicle and/or when two vehicles are platooning. Also, in some embodiments described herein, as opposed to ACC systems, wireless transmissions are sent between the two vehicles. Moreover, it should be noted that in some embodiments, torque limits applied by the systems herein may continue from the beginning of a platoon until the end of that platoon (e.g., from the start of a draw-in through the completion a dissolve), as opposed to ACC systems which generally only limit torque when approaching a front vehicle.

As such, it should be appreciated by one skilled in the art that embodiments described herein describe a platooning system that implements features of cruise control systems in drastically different ways than those envisioned by cruise control systems on their own.

In various embodiments described in this disclosure, a platooning electronic control unit (e.g., a platooning ECU (PECU)) and/or an EECU may be determined to be operating correctly, while other electronic control units (ECUs), such as a brake electronic control unit (BECU) may be determined to not be operating correctly. In some embodiments, an EECU may also at least partially control and/or monitor a cruise control system. In the event where a BECU and/or EECU (and/or a cruise control system which may be incorporated in that EECU) are determined to not be operating correctly, a PECU may cause a platoon to dissolve (e.g., end), or not form at all. In other words, in some embodiments, a cruise control system such as a normal cruise control system, an ACC system and/or a PCC system may be operate in concert with a platooning system, and, in response to a determination of a fault in the cruise control system, the platooning system may also be disengaged (e.g., dissolve or not allow a platoon to form).

FIG. 1 illustrates a diagram of vehicles transmitting data, in accordance with some embodiments. FIG. 1. depicts multiple vehicles 110, 112, 114, 116, 120, and 122. FIG. 1 also depicts a base station 130 and a network 140. In various embodiments, vehicle 110 may transmit data (also referred to as information) to other vehicles 112, 114, 116, 120, and 122 directly, via base station 130, and/or via network 140. Vehicle 110 may also receive data from other vehicles 112, 114, 116, 120, and 122 directly, via base station 130, and/or via network 140. In some embodiments, a vehicle (e.g., vehicle 112) may retransmit information received from a first vehicle (e.g., vehicle 110) to another vehicle (e.g., vehicle 116) with or without additional information (e.g., information generated at vehicle 112 in addition to information received from vehicle 110).

In various embodiments, vehicles 110, 112, 114, 116, 120, and 122 may be configured to platoon, and may platoon with one another. In some embodiments, vehicles may transmit and/or receive data (e.g., to a NOC and/or fleet management system, etc.) including, but not limited to data indicating: whether they are available to platoon; whether they are platooning; whether a platoon they were part of dissolved; what direction they are traveling; what direction they are predicted (e.g., predetermined/planning on/suggested) to be traveling on for a particular period of time; when they are expected to stop (e.g., predetermined to stop, planning on stopping, suggested stopping time); where they plan on stopping; what route(s) they plan to travel (e.g., a route suggested and/or determined by a system, a route determined by a navigation/mapping system based on their destination such a system may be a rendezvousing system, a fleet management system, a navigation system, etc.); what type of platooning system they are equipped with; how many hours they have been on the road; weather they are capable of following the leader (e.g., if one or more vehicles can platoon without a driver); whether they are capable of being the leader in a follow-the-leader system; whether the vehicle is fully autonomous (e.g., capable of level 4 according to the SAE classification system); how much fuel they have saved; how much money they have saved; an area they are allowed to travel within; an area they are not allowed to travel outside of; whether they are capable of platooning on city streets; whether they are only capable of platooning on a highway; whether they are capable of platooning on non-public roads; whether they are capable of platooning in a particular construction site, mine, forest, etc.; and whether other attributes associated with a vehicle's account allows them to platoon. As should be understood, one or more of these attributes may be used to determine whether a vehicle can platoon with one or more additional vehicles, and whether a vehicle should platoon with one or more additional vehicles. It is contemplated that in some embodiments, a system may rank one or more vehicles with which a vehicle should platoon. In such an embodiment, if a target vehicle (e.g., a vehicle with a high ranking) that a first vehicle attempts to platoon with platoons with second vehicle before the first vehicle is able to platoon with the target vehicle, then the first vehicle may select another (e.g., the next) ranked vehicle that the system would like it to (e.g., determines that it should attempt to) platoon with.

In addition to these factors, other information that a vehicle may transmit and/or receive may include data including, but not limited to data associated with a/an: position, latitude, longitude, altitude, heading, speed, longitudinal and lateral acceleration, relative angle, type of load (e.g., type of materials a vehicle is carrying), brake status, brake pressure, path history, path projection, travel plans, vehicle size, vehicle type, brake type, current operating mode (autonomous or manual), map data, traffic information, GPS augmentation information (e.g., delays from infrastructure), wheel speed, wheel torque, gross torque, net torque, wind, rain, music, video, infotainment system, suspension, axle weight(s), transmission status (e.g., what gear the vehicle is in, what gear the vehicle was in, what gears the vehicle transferred from and to (e.g., fifth gear to fourth gear)), previous transmission status, hybrid vehicle drivetrain (e.g., a parallel hybrid or an electric hybrid), whether a vehicle has an electric motor, battery, electronic throttle control, throttle pedal, brake pedal, power steering, adaptive cruise control, a blowout, interior lighting, exterior lighting, retarder, anti-lock brakes, emergency braking, engine governor, powertrain, gear ratio, wheel size, wheel type, trailer length, trailer type, trailer height, amount of trailers, trailer position, current trailer position, past trailer position, tractor type, tractor height, transceiver type, current fuel, next determined stop, projected miles remaining until fuel tanks are empty, malfunctions, turn signals, LIDAR, radar, ultrasonic sensors, road surface, wheel angle, tire pressure, cabin temperature, engine temperature, trailer interior temperature, camera, fleet of vehicles, NOC, computer vision, other vehicle traveling in the same direction, other vehicle traveling in an opposite direction, and intervening traffic (e.g., cut-ins, also referred to as the situation when a vehicle enters an area between a lead vehicle and a rear vehicle). This information can be used by one or more vehicles, systems, fleets, etc. to determine whether a vehicle may platoon with another vehicle and/or to determine the best vehicle with which a vehicle may platoon. Again, it is contemplated that in some embodiments, a system may rank one or more vehicles with which a vehicle should platoon, and this ranking may be based on vehicle attributes described above. In such an embodiment, if a target vehicle that a first vehicle wishes to platoon with platoons with another vehicle before the first vehicle is able to platoon with the target vehicle, then the first vehicle may move to another (e.g., the next) ranked vehicle that the system would like it to (e.g., determines that it should attempt to) platoon with.

It should be understood that, herein, when a system determines a rendezvous location and/or rendezvous time, that any of these attributes/information/data may be used alone or in combination to determine: whether two or more vehicles can platoon together, a rendezvous location, a rendezvous time, etc.

Figure 2:
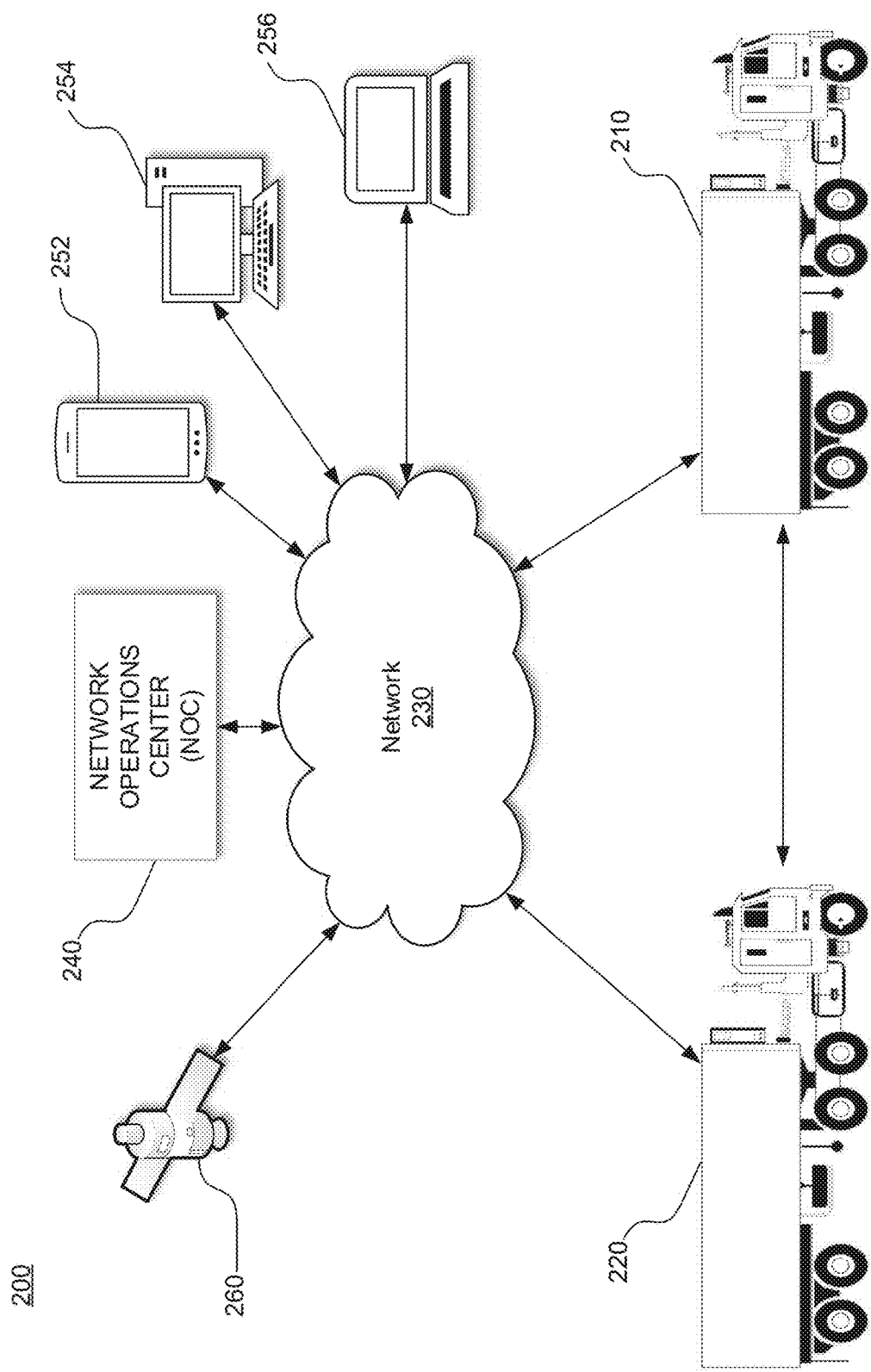
FIG. 2 illustrates a block diagram of a platooning system, in accordance with some embodiments.

FIG. 2 illustrates an example system 200 including two vehicles capable of platooning and associated communication links. Vehicles 210 and 220 are depicted by trucks which are capable of platooning, and can communicate with each other directly or through network 230. Direct communication between two vehicles can occur wirelessly via Dedicated Short Range Communications (DSRC) (e.g., the IEEE 802.11p protocol), which is a two-way short to medium range wireless communications technology that has been developed for vehicle-to-vehicle (V2V) communications. Of course, other communications protocols and channels may be used in addition to or in place of a DSRC link. For example, the inter-vehicle communications may additionally or alternatively be transmitted over a cellular communications channel such as 4G LTE Direct, 5G, a Citizen's Band (CB) Radio channel, one or more General Mobile Radio Service (GMRS) bands, one or more Family Radio Service (FRS) bands, Wi-Fi, Zigbee and/or any other now existing or later developed communications channels using any suitable communication protocols either alone or in combination.

FIG. 2 also includes a network operations center (NOC) 240. NOC 240 may include one or more locations from which network monitoring, control, and/or management may be exercised over a communication network (e.g., a NOC may be located in the cloud/a multi-tenant environment). NOC 240 can oversee a complex network of vehicles, satellite communications, cellular networks, web applications, and/or management tools. Users of NOC 240 may be responsible for monitoring one or more networks, sub-networks, fleets of vehicles, and/or sub-fleets of vehicles that may require special attention to avoid degraded service. For example, NOC 240 may receive information about various vehicles 210 and 220 such as their locations and attributes, run various programs based on the received information, and send information back to vehicles 210 and 220, including indicating whether they are allowed to platoon.

In addition to NOC 240, client devices 252 (e.g., a smartphone or tablet), 254 (e.g., a desktop computer or terminal), and 256 (e.g., a laptop computer or terminal) may be used to send and/or receive information about vehicles 210 and 220, NOC 240, or information from canonical sources such as the Internet (e.g., Google Maps or another online map provider, a traffic provider, a weather provider, etc.). Client devices can be used to view attributes of vehicles 210 and 220 such as their location, an estimate of their weight, their speed, an amount of engine torque, amount of applied break, a destination, etc.

FIG. 2 also includes a satellite 260, which can send signals to network 230, NOC 240, and/or vehicles 210 and 220. Satellite 260 may be part of a satellite navigation system such as a global navigation satellite system (GNSS). GNSSs include the United States's Global Positioning System (GPS), Russia's GLONASS, China's BeiDou Navigation Satellite System, and the European Union's Galileo. Based on information sent from satellite 260, systems described herein can determine locations of vehicles 210 and 220.

Of course, it should be appreciated that the system described in FIG. 2 is only an example, and that many other configurations may exist. For example, a NOC may assist with the monitoring and control of hundreds or thousands of vehicles, and many types of web applications may exist.

Figure 3:
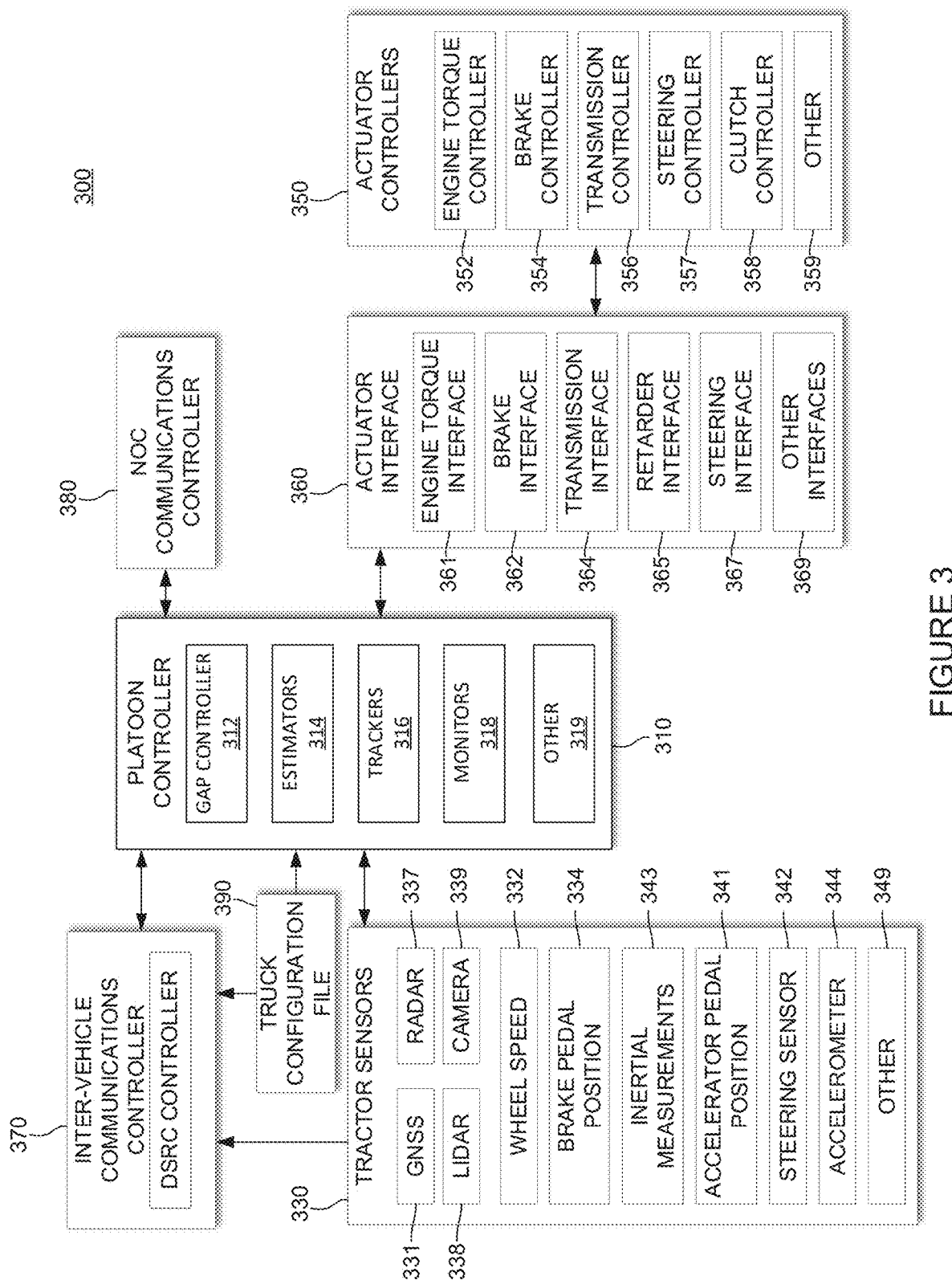
FIG. 3 illustrates a block diagram of a system including an electronic control unit, in accordance with some embodiments.

FIG. 3 illustrates and example system 300 including a platoon controller 310 (also referred to as a platoon electronic control unit, a platoon ECU, or a PECU). As described throughout this disclosure, a wide variety of configurations may be used to implement platooning systems described herein. The specific controller design can vary based on the level of automation contemplated for the controller, as well as the nature of and equipment available on the host vehicles participating in the platoon. FIG. 3 illustrates components of one possible configuration.

FIG. 3 diagrammatically illustrates a vehicle control architecture that can be suitable for use with platooning tractor-trailer trucks. The specific controller, or platooning ECU, illustrated is primarily designed for use in conjunction with a platooning system in which both vehicles include an active driver. The driver of the lead vehicle being fully responsible for control of the lead vehicle. In some embodiments the driver of the rear vehicle may be responsible for steering the rear vehicle, but the platoon controller 310 is primarily responsible for controlling the rear vehicle's torque and braking requests during active platooning. However, as discussed herein, it should be appreciated that generally similar control schemes can be used in systems which contemplate more automated control of one or both of the platoon partners or which utilize vehicle control commands other than or in addition to torque and braking requests.

In the example embodiment illustrated in system 300, a platoon controller 310, receives inputs from a number of sensors 330 on the tractor and/or one or more trailers or other connected units, and a number of actuator controllers 350 (also referred to as electronic control units or ECUs) arranged to control operation of the tractor's powertrain and other vehicle systems. An actuator interface 360 may be provided to facilitate communications between the platoon controller 310 and the actuator controllers 350. In some embodiments, one or more of the actuator interfaces 360 may be included in one or more of the actuator controllers 350 (e.g., an actuator interface may be included in an ECU). Platoon controller 310 also interacts with an inter-vehicle communications controller 370 (also referred to as an inter-vehicle communications ECU) which orchestrates communications with the platoon partner and a NOC communications controller 380 (also referred to as a NOC communication ECU) that orchestrates communications with a NOC. The vehicle also may have selected configuration files 390 that include known information about the vehicle.

Some of the functional components of the platoon controller 310 include gap controller 312, a variety of estimators 314, one or more partner vehicle trackers 316 and various monitors 318. In many applications, the platoon controller 310 will include a variety of other components 319 as well.

Some of the sensors utilized by platoon controller 310 may include GNSS unit 331, wheel speed sensors 332, inertial measurement devices 343, radar unit 337, lidar unit 338, cameras 339, accelerator pedal position sensor 341, steering wheel position sensor 342, brake pedal position sensor 334, and various accelerometers 344. Of course, not all of these sensors will be available on all vehicles involved in a platoon and not all of these sensors are required in any particular embodiment. A variety of other sensors 349 (now existing or later developed or commercially deployed) may be additionally or alternatively be utilized by platoon controller 310 in other embodiments.

Many (but not all) of the described sensors, including wheel speed sensors 332, radar unit 337, accelerator pedal position sensor 341, steering wheel position sensor 342, brake pedal position sensor 334, and accelerometer 344 are relatively standard equipment on newer trucks (tractors) used to pull semi-trailers. However, others, such as GNSS unit 331 and lidar unit 338 (if used) are not currently standard equipment on such tractors or may not be present on a particular vehicle and may be installed as needed or desired to help support platooning.

FIG. 3 also illustrates various actuator controllers 350. It should be understood that, in various embodiments, some or all types of controllers may be referred to interchangeably as electronic control units (ECUs). It should, however, be understood that some ECUs may control actuators, some ECUs may control communications, some ECUs may monitor sensors, and some may perform any combination thereof. Thus, it should be appreciated that the system shown in FIG. 3 is merely one of a wide variety of systems that may be used to control platooning.

Some of the vehicle actuator controllers 350 that platoon controller 310 may direct at least in part include engine torque controller 352; brake controller 354; transmission controller 356; steering/automated steering controller 357;

and clutch controller 358. Of course, not all of these actuator controllers will be available or are required in any particular embodiment and it may be desirable to interface with a variety of other vehicle actuator controllers 359 that may be available on the vehicle as well. Therefore, it should be appreciated that the specific actuator controllers 350 directed or otherwise utilized by the platoon controller on any particular controlled vehicle may vary widely. Further, the capabilities of any particular actuator controller (e.g. engine torque controller 352), as well as its interface (e.g., the nature and format of the commands, instructions, requests and messages it can handle or generate) will often vary with the make and model of that particular actuator controller. Therefore, an actuator interface 360 is preferably provided to translate requests, commands, messages and instructions from the platoon controller 310 into formats that are appropriate for the specific actuator controller hardware and software utilized on the controlled vehicle. The actuator interface 360 also provides a mechanism for communicating/translating messages, commands, instructions and requests received from the various actuator controllers back to the platoon controller 310. In some embodiments, an appropriate actuator interface may be provided to interact with each of the specific vehicle controllers utilized. In various embodiments, this may include one or more of: an engine torque interface 361; a brake interface 362; a transmission interface 364; a retarder interface 365; a steering interface 367; and/or any other appropriate controller interface 369. In some embodiments, various controllers may be combined (e.g., in the case of a chassis controller, or an engine ECU that also controls a retarder—which may obviate the need for a retarder ECU).

Large trucks and other heavy vehicles frequently have multiple systems for "braking" the truck. These include the traditional brake system assemblies mounted in the wheels of the vehicle—which are often referred to in the industry as the "foundation brakes." Most large trucks/heavy vehicles also have an engine brake (a mechanism colloquially referred to as a "retarder") that is used to augment the foundation brakes and serve as an alternative mechanism for slowing the vehicle or to help prevent the vehicle from accelerating down a hill. Often, the retarder may be controlled by the engine torque controller 352 and in such embodiments, the retarder can be controlled by sending appropriate torque commands (which may be negative) to engine torque controller 352. In other embodiments a separate retarder controller (not shown) may be accessible to, and therefore directed by, platoon controller 310 through an appropriate retarder interface 365. In still other embodiments, the platoon controller 310 may separately determine a retarder command that it sends to the actuator interface 360. In such embodiments the actuator interface will interpret the retard command and pass on appropriate retardation control commands to an Engine ECU or other appropriate vehicle controller.

The communications between vehicles may be directed over any suitable channel and may be coordinated by inter-vehicle communications controller 370. As described above, the DSRC protocol may work well.

The specific information transmitted back and forth between the vehicles may vary widely based on the needs of the controllers. In various embodiments, the transmitted information may include the current commands generated by the platoon controller 310 such as requested/commanded engine torque, and/or requested/commanded braking deceleration. They may also include steering commands, gear commands, etc. when those aspects are controlled by platoon controller 310. Corresponding information is received from the partner vehicle, regardless of whether those commands are generated by a platoon controller or other suitable controller on the partner vehicle (e.g., an adaptive cruise control system (ACC) or a collision mitigation system (CMS)), or through other or more traditional mechanisms— as for example, in response to driver inputs (e.g., accelerator pedal position, brake position, steering wheel position, etc.).

In many embodiments, much or all of the tractor sensor information provided to platoon controller 310 is also transmitted to the platoon partner and corresponding information is received from the platoon partner so the platoon controllers 310 on each vehicle can develop an accurate model of what the partner vehicle is doing. The same is true for any other relevant information that is provided to platoon controller 310, including any vehicle configuration information 390 that is relevant to platoon controller 310. It should be appreciated that the specific information transmitted may vary widely based on the requirements of platoon controllers 310, the sensors and actuators available on the respective vehicles, and the specific knowledge that each vehicle may have about itself.

The information transmitted between vehicles may also include information/data about intended future actions as will be discussed in greater detail below. For example, if the lead vehicle knows it is approaching a hill, it may expect to increase its torque request (or decrease its torque request in the context of a downhill) in the near future and that information can be conveyed to a rear vehicle for use as appropriate by the platoon controller 310. Of course, there is a wide variety of other information that can be used to foresee future torque or braking requests and that information can be conveyed in a variety of different forms. In some embodiments, the nature of the expected events themselves can be indicated (e.g., a hill, curve, or exit is approaching) together with the expected timing of such events. In other embodiments, the intended future actions can be reported in the context of expected control commands such as the expected torques and/or other control parameters and the timing at which such changes are expected. Of course, there are a wide variety of different types of expected events that may be relevant to the platoon control.

The communications between the vehicles and the NOC may be transmitted over a variety of different networks, such as a cellular network, various Wi-Fi networks, DSRC networks, satellite communications networks and/or any of a variety of other networks as appropriate. The communications with the NOC may be coordinated by NOC communications controller 380. The information transmitted to and/or received from the NOC may vary widely based on the overall system design. In some circumstances, the NOC may provide specific control parameters such as a target gap. These control parameters or constraints may be based on factors known at the NOC such as speed limits, the nature of the road/terrain (e.g., hilly vs. flat, winding vs. straight, etc.) weather conditions, traffic or road conditions, etc. In other circumstances the NOC may provide information such information to platoon controller 310. The NOC may also provide information about the partner vehicle including its configuration information and any known relevant information about its current operational state such as weight, trailer length, etc.

Lastly, with regard to FIG. 3, configuration file 390 may include a wide variety of information about the host vehicle that may be considered relevant to controller 310. By way of example, some of the information might include the vehicle's specification including such things as engine performance characteristics, available sensors, the existence and/or type of platooning indicators (e.g., lights that indicate a vehicle is platooning), the nature of its braking system, the location of its GNSS antenna relative to the front of the cab, gear ratios, differential ratios etc. In some embodiments, configuration file 390 may include information about a driver, a fleet, a fleet's schedule, a driver rating, a driver's ability to use the system, whether a vehicle has permission to use a system, whether a vehicle is certified to use the system, etc.

Figure 4A:
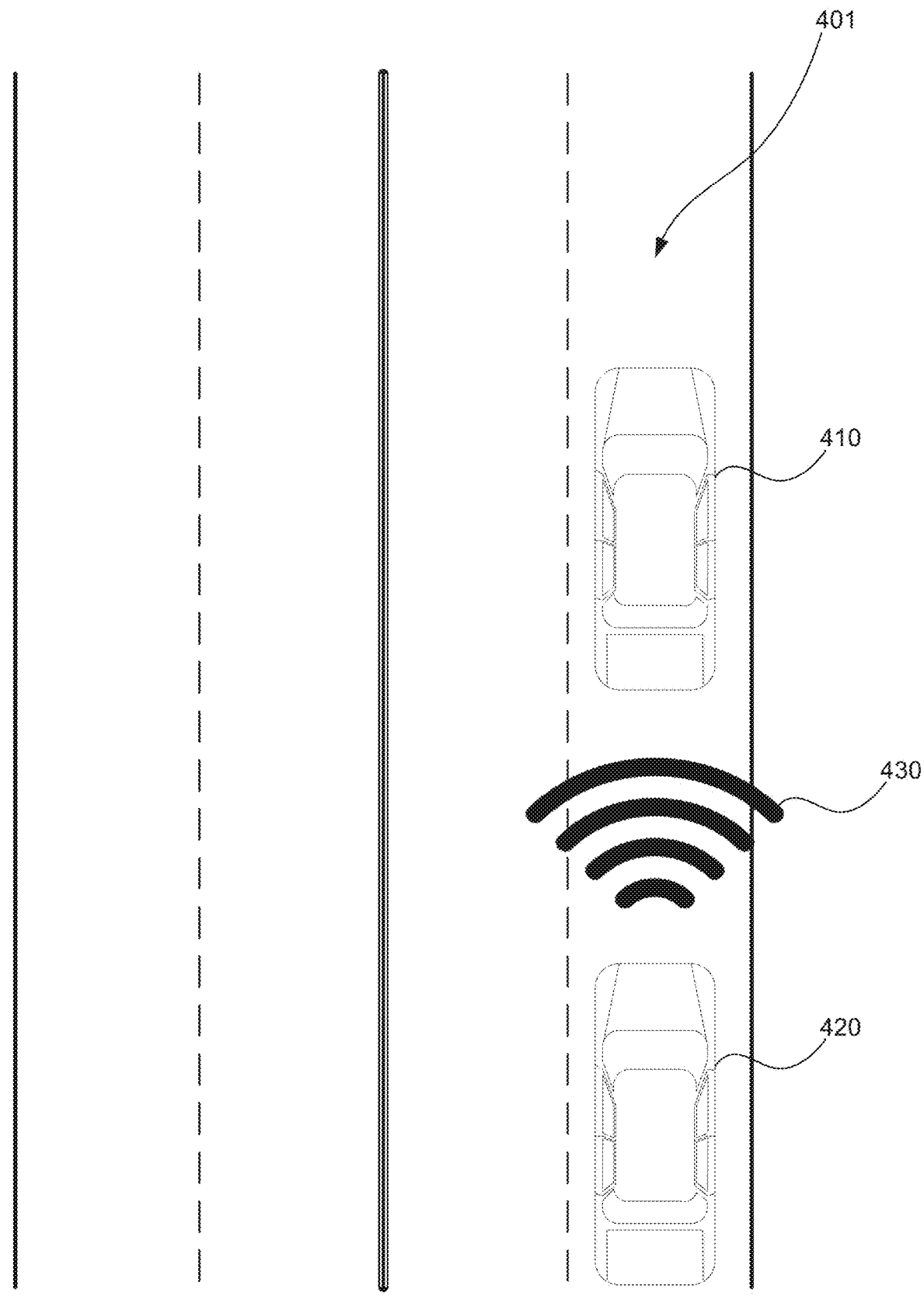
FIGS. 4A-4D illustrate example vehicle systems, in accordance with some embodiments.

FIG. 4A illustrates an example vehicle system 401, in accordance with some embodiments. Example vehicle system 401 includes a front vehicle 410, and rear vehicle 420. Rear vehicle 420 may include a radar 430 (e.g., a forward looking radar (FLR)) that can send radio waves to detect at least a distance, angle, and/or velocity of an object such as front vehicle 410. Of course, other sensors and/or transceivers may be used in addition to, or instead of radar 430 to determine at least a distance, angle, and/or velocity of an object including a DSRC and/or 5G transceiver, and/or a LIDAR and/or sonar device.

As described above, while ACC systems may be designed to provide a margin of safety to allow a following vehicle sufficient time to react to rapid deceleration of a leading vehicle. Platooning systems are intended to reduce the overall drag of two or more vehicles by optimally placing following vehicles within a lead vehicle's slipstream. While both platooning systems and ACC systems may rely on limiting engine torque control, ACC systems rely solely on sensor measurements originating from the follow vehicle alone to determine the amount of torque limitation required to maintain a safe headway. Platooning systems, as shown at least in FIG. 4C, may continuously communicate sensor measurements between all participating vehicles to determine an optimal torque limit required to adjust the gap. By sharing sensor measurements and internal states between vehicles, vehicles in a platoon determine the correct gap much better than a single vehicle independently maintaining headway with an ACC system. For example, a rear vehicle in a platoon can react to changes in velocity of a front vehicle (which, in some cases, may be sensed/determined by one or more devices/modules on the front vehicle).

In some embodiments, ACC systems are intermittently called upon to apply engine torque limits to control a distance between the follow vehicle and any forward vehicle that is in the direct path of the follow vehicle and encroaches on the minimum headway distance. In the absence of a forward vehicle, the adaptive control system does not limit engine torque and reverts to the primary operational mode of speed control. In some embodiments described herein, a cruise control based platooning control system (e.g., a platooning system that utilizes a cruise control system, or vice-versa) limits torque continuously to maintain a precise vehicle gap. ACC systems use speed control as the primary mode of control according to a speed set point manually determined by the vehicle operator when the cruise control system is engaged. When a forward vehicle encroaches on the minimum headway distance, the ACC system engages engine torque limiting as a secondary control mode to increase headway to the forward vehicle by reducing speed. A platooning system, however, automatically engages standard cruise control and establishes a speed set point that is higher than the current vehicle speed. In some embodiments, the follow vehicle is never intended to travel at the selected cruise control speed set point. Instead, the platooning control system continuously limits engine torque on the following vehicle as the sole mode of longitudinal control to maintain a precise gap with respect to the forward vehicle, in some embodiments.

In some embodiments, a CC system (which, of course, may refer to an ACC system) can command the shifting in the vehicle it is located in and/or another vehicle. In one embodiment, a platooning system may cause a CC system to command said shifting. For example, a PECU may send a signal to a cruise control ECU (CCECU) and/or Adaptive Cruise Control ECU (AAECU) causing at least a portion of one or more of the CCECU, AAECU, transmission ECU (TECU), and EECU to cause a front and/or rear vehicle to shift gears. In some embodiments, a platooning system can cause at least a portion of a cruise control system to use transmission shifting profiles (which may be defined by a cruise control system), which can cause a front and/or rear vehicle's transmission to upshift and/or downshift, and can cause an at least semi-automated vehicle system to operate as desired.

Figure 4B:
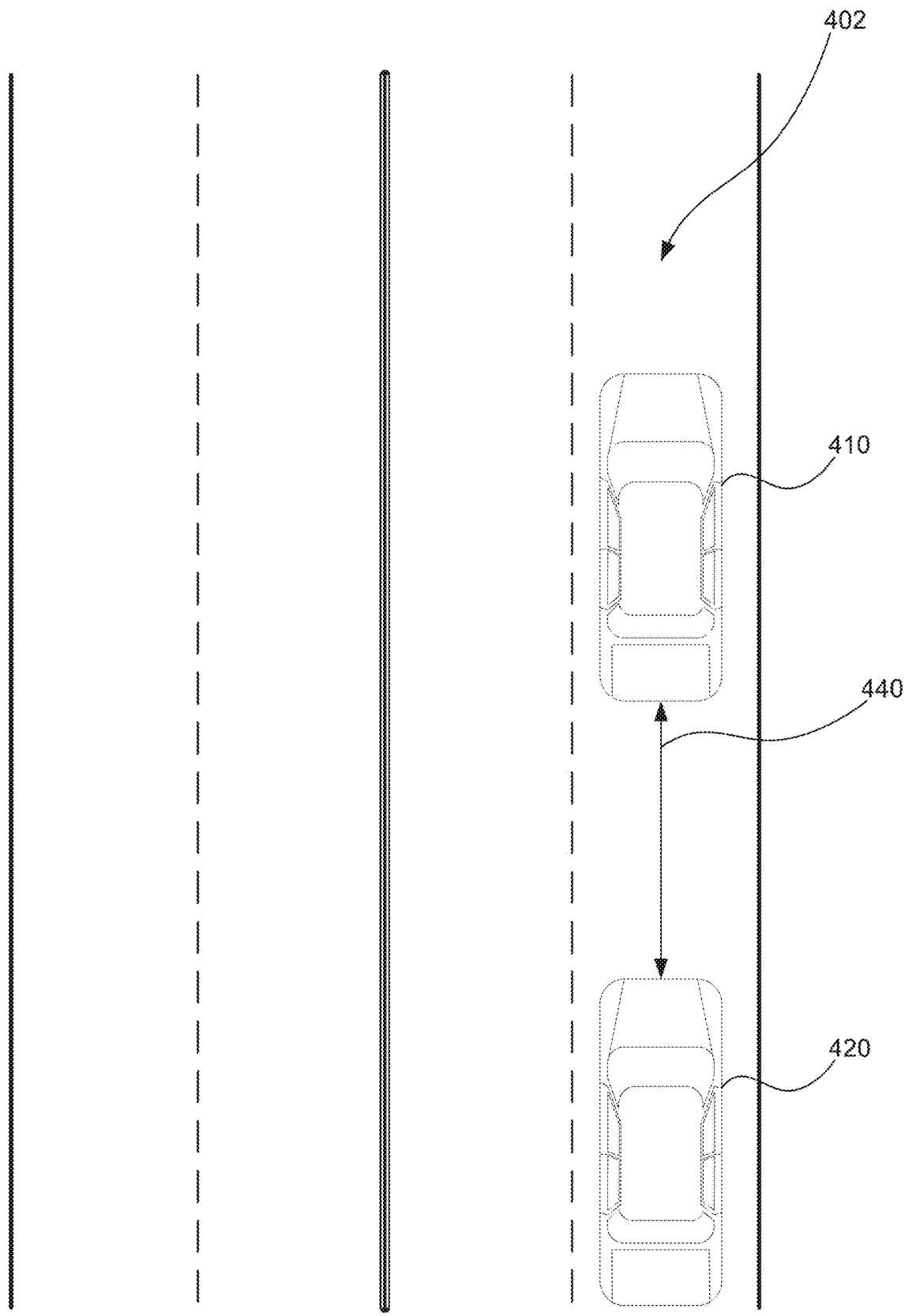

FIG. 4B illustrates an example vehicle system 402, in accordance with some embodiments. Example vehicle system 402 includes a front vehicle 410, and a rear vehicle 420. Rear vehicle 420 may include receiver, transmitter, and/or transceiver that can send and/or receive signals 440 to detect at least a distance, angle, and/or velocity of an object such as front vehicle 410. Of course, signals 440 may include instructions as described herein, such as commanding and/or controlling torque, speed, a gap, etc.

Figure 4C:
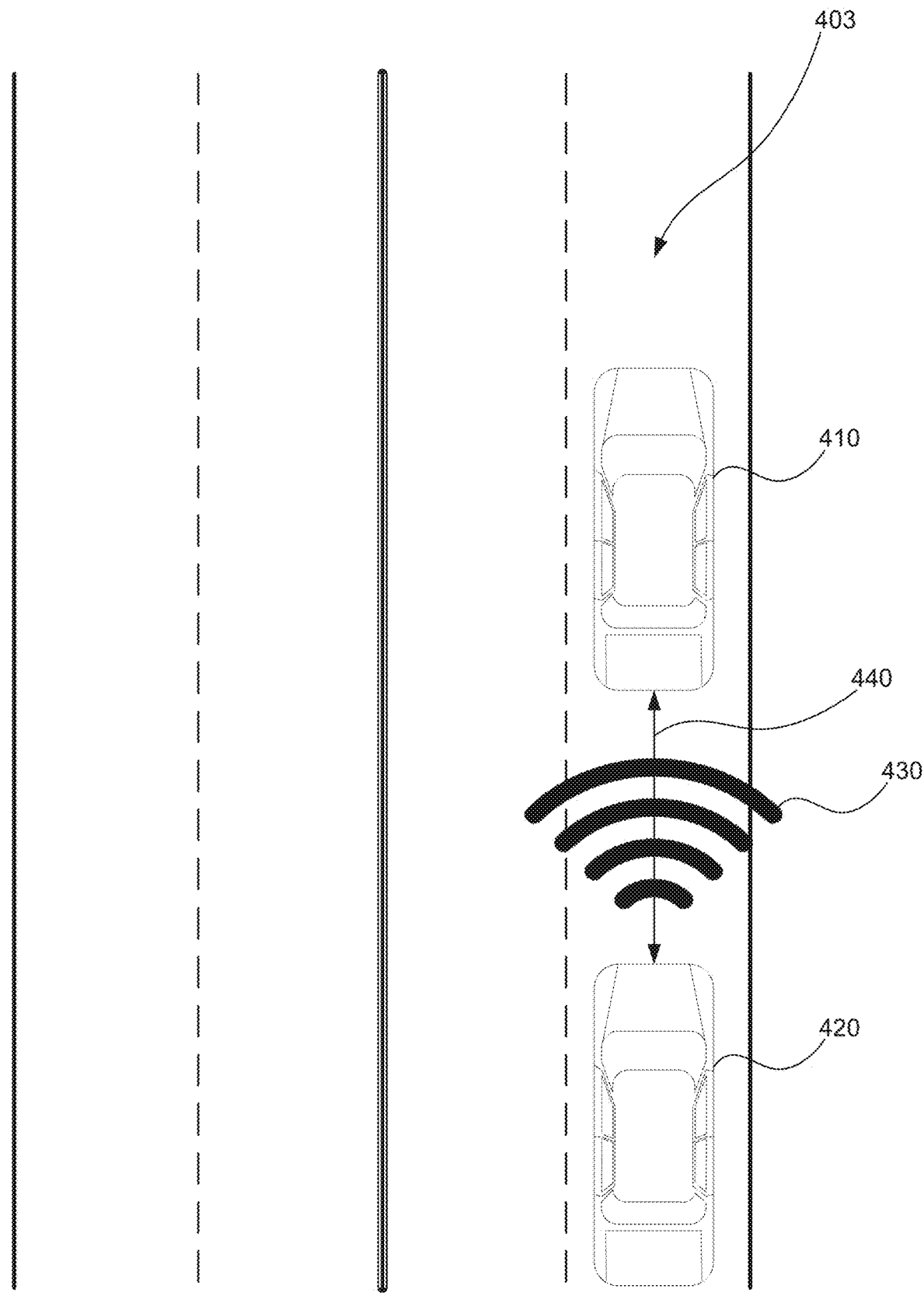

FIG. 4C illustrates an example vehicle system 403, in accordance with some embodiments. Example vehicle system 403 includes a front vehicle 410, and a rear vehicle 420. Rear vehicle 420 may include a transceiver that can receive and/or send signals 440, and/or a radar 430 (e.g., an FLR) that can send radio waves. Signals and/or radio waves may be used by vehicle system 403 to detect at least a distance, angle, and/or velocity of an object such as front vehicle 410. at least a distance, angle, and/or velocity of an object such as front vehicle 410. Of course, signals 440 may include instructions as described herein, such as commanding torque, speed, a gap, etc.

In various embodiments, signals 440 may be generated by a platooning system, which may be at least in part included in a PECU. Radar commands may be generated by a cruise control system (e.g., a normal cruise control system, an ACC system, and/or a predictive cruise control system), which may be at least in part included in a cruise control electronic control unit (CCECU, which may be referred to as an ACCECU if it is capable of implementing adaptive cruise control, or a PCCECU if it is capable of implementing predictive cruise control). In some embodiments described herein, an EECU may include at least a portion of a cruise control system, and in such a case any CCECU or cruise control system mentioned herein may refer to an EECU. For instance, a CCECU may not exist, and the cruise control functionality is performed by an EECU. In some embodiments, various ECUs can be combined. For instance, it is contemplated that a CCECU can be included in an EECU.

In some embodiments, a vehicle electronic control unit (VECU) may monitor and/or control an engine, a platooning system, a brake system, and/or a cruise control system. Further, in various embodiments, various functionality included in one or more systems may be included in a different system. For example, a platooning system, a cruise control system, an engine system, and/or a braking system may perform all, some, or none of the functionality of the other systems. Along the same lines, in some embodiments, functionality of a platooning system, cruise control system, engine system, and/or braking system may be included in a PECU, CCECU, EECU, and/or BECU.

In one example system, a VECU may receive signals from a driver (e.g., a button, lever on a steering column, etc.), and the VECU may interpret those signals and cause an EECU to engage in cruise control (or ACC or PCC) at a particular selected speed. As another example, where the system includes a PECU, a platoon starts, and a VECU sends a signal to an EECU engage the cruise control and establish a speed set point at a maximum vehicle speed, and a torque limiting signal is sent to an EECU to limit an amount of torque to achieve and/or maintain a gap while platooning. This torque limiting signal may be sent by the PECU, or in some cases a CCECU, or both. As another example, a BECU can send an inhibiting signal to disengage cruise control, and the torque limits sent by the PECU are moot because the cruise control has already been disengaged.

In some embodiments, a cruise control system may be disengaged and/or modified (e.g., an amount of torque commanded by a cruise control system may be interrupted, ended, increased, and/or decreased). Such actions may be caused by a cruise control system alone, or by a cruise control system in combination with another system, such as a platooning system. As an example, a platooning system may cause a cruise control system to interrupt, disengage, and/or be modified, in response to a traction control system being activated (e.g., attempting to command and/or control torque). Of course, another system instead of or in addition to a traction control system may cause such actions by a platooning system and/or cruise control system. For example, an electronic stability control system, or another system that is at least a part of an at least semi-autonomous driving system, may cause a platooning system and/or cruise control system to perform these actions.

In one embodiment, a PECU may cause a CCECU to command and/or control torque, and in response to another ECU (e.g., a traction control ECU, an electronic stability control ECU, a lane-keep ECU, a VECU, a BECU, a TECU, an EECU) at least attempting to command and/or control torque, the CCECU may stop commanding and/or controlling torque.

In some embodiments, a system may cause the various actions described herein (e.g., those performed by a cruise control system/CCECU) while vehicles are not platooning and/or do not include a platooning system. In some embodiments, the various actions described herein (e.g., those performed by a cruise control system/CCECU) by any type of automated driving system including a follow-the-leader-type system, such as those described in U.S. Provisional Patent Application No. 62/695,014, filed on Jul. 7, 2018, which is hereby incorporated in its entirety for all purposes.

In some embodiments described herein, a platooning system may receive signals from a cruise control system, and actuate portion(s) of a vehicle based on the signals received from the cruise control system. For example, a platooning system may receive an indication that a cruise control system should be stopped (e.g., because a driver pressed a brake pedal), and in response the platooning system may cause a platoon to dissolve. As another example, a signal generated at radar 430 may cause a platooning system to command portions of a vehicle, for instance the signal may cause the gap to change. In some cases, this signal from radar 430 may be received by a CCECU and then transmitted to a PECU. Disengaging cruise control may also be caused by, for example: any state where there is insufficient headway to a front vehicle, not making safe transitions in response to signals that a system is requesting, and anything that an error indicated by a braking system (e.g., a braking system's (BECU's) internal system that indicates there is a potential malfunction in the brake system), and/or any indication of an error elsewhere in a vehicle.

In some embodiments described herein, a platooning system may send signals to a cruise control system, and the cruise control system may actuate portion(s) of a vehicle based on the signals sent from the cruise control system. For example, a cruise control system may receive a command to achieve a certain gap, and the cruise control system may then cause an amount of torque to be provided by an engine (in some cases, via an EECU) and/or limited (e.g., by a PECU and/or EECU) to achieve the amount of torque.

Figure 4D:
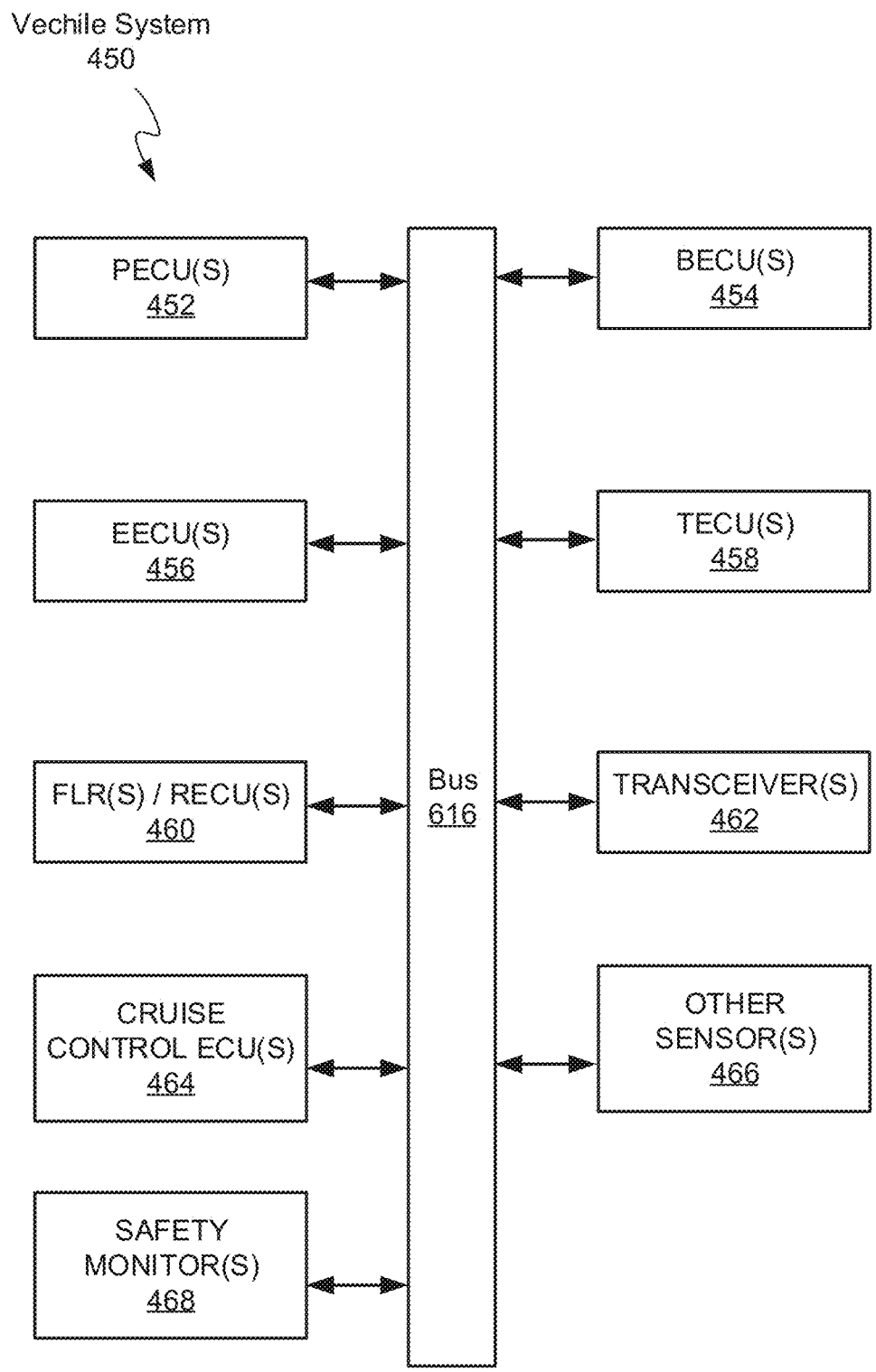

FIG. 4D illustrates an example vehicle system 450, in accordance with some embodiments. Example vehicle system 450 includes one or more PECUs 452, one or more BECUs 454, one or more EECUs 456, one or more TECUs 568, one or more FLRs and/or Radar Electronic Control Units (RECUs) 460, one or more transceivers 462, one or more CCECUs 464 (which may be a normal cruise control system, an ACC system, and/or a PCC system), one or more safety monitor(s) 468, and/or one or more other sensors 466.

In some embodiments described herein, one or more components shown in Vehicle System 450 may include, command, and/or control one or more other components. For example, a BECU 454 may include an FLR (used interchangeably herein with a Forward Looking Radar, an RECU, a radar system, etc.). In some embodiments, a PECU 452 may cause a dissolve and/or prevent a platoon from forming in response to a signal from a CCECU 464. Such a signal may be provided to PECU 452 from CCECU 464 in response to a brake pedal being pressed, or any other event causing cruise control to disengage, return control to a driver, and/or otherwise initiate an end to cruise control. Other events that could cause a cruise control to disengage (where, for instance, torque is disengaged) may include: any state where there is insufficient headway to a front vehicle, not making safe transitions in response to signals that a system is requesting, and anything that an error indicated by a braking system (e.g., a braking system's (BECU's) internal system that indicates there is a potential malfunction in the brake system), and/or any indication of an error elsewhere in a vehicle.

In addition, in some embodiments, vehicle system 403 may allow one or more vehicles to use a type of cruise control system (e.g., ACC and/or PCC) in conjunction with a platooning system. In some embodiments, a platooning system may receive one or more signals from the cruise system that cause the platooning system to dissolve a platoon (or perform another action).

For example, if an ACC system, which may be at least in part controlled by a BECU, were to take at least partial control of a system, and then relinquish at least partial control of a system, a PECU may receive a signal that causes the PECU to dissolve and/or prevent a platoon.

In some embodiments, a platooning system may directly monitor disengagement information (e.g., rather than a cruise control system providing the platooning system with disengagement information). For example, if a cruise control system communicates via a J1939 bus, and both the cruise control system and the platooning system are monitoring signals that indicate a disengagement should occur, a platooning system may cause an action (such as a dissolve) in response to the signal indicating a disengagement should occur. In some embodiments, a signal indicating a brake pedal was pressed, and/or that a system other than a cruise control system is commanding and/or controlling torque, may cause a platooning system to cause a dissolve. In some embodiments, information about a cruise control system disengaging may be received by a platooning system from a source other than the cruise control system. For example, a BECU, an EECU, a TECU, a VECU, etc. may transmit information (e.g., directly, or at least not via a cruise control system) to a platooning system indicating a cruise control system disengaged.

In some embodiments, a vehicle may include a safety monitor 468. In some embodiments, a safety monitor include at least part of example safety monitors described in U.S. patent application Ser. Nos. 15/860,024, 15/860,333, and/or 15/860,450, which are hereby incorporated in their entirety for all purposes. In some embodiments, a safety monitor (which may be referred to as a safety monitor system) may be included in a cruise control system and/or a CCECU, and may determine that a signal was sent from another system/ECU, and cause an action to occur such as a dissolve. For example, a safety monitor system running on a CCECU may check for (e.g., request a status of), and/or otherwise receive, a signal from a PECU. In response to receiving the signal, a CCECU may cause a platoon to dissolve. In some embodiments, a safety monitor system may be included in one or more systems/ECUs. For example, a safety monitor may be distributed across multiple ECUs. Such a safety monitor may be included in, and/or detect a fault in, one or more systems included on a front and/or rear vehicle such as a braking system, a transmission system, an engine control module, etc.

Figure 5:
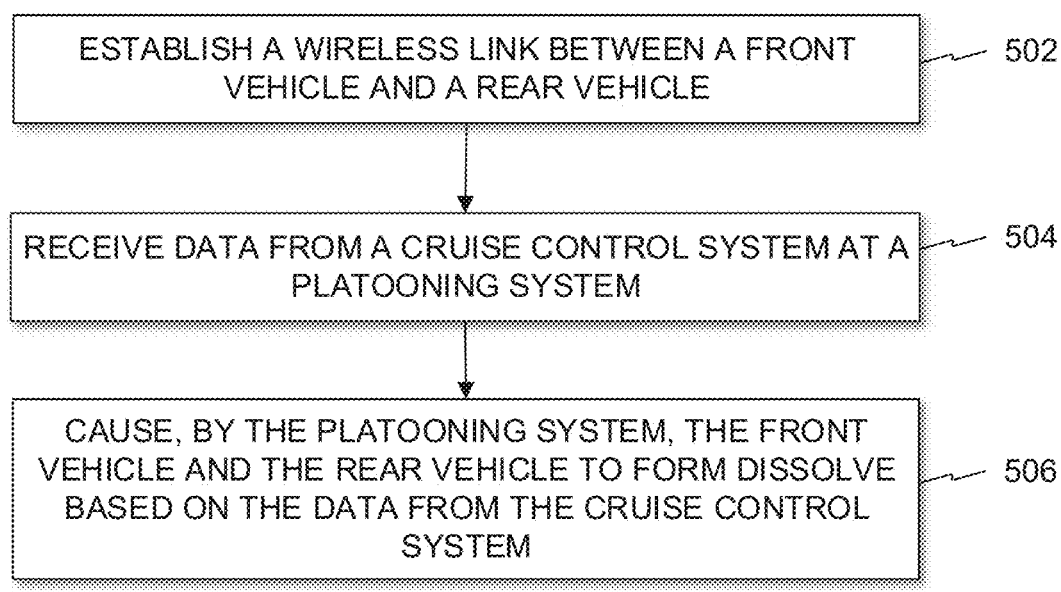
FIGS. 5 and 6 illustrate flow charts of an example processes, in accordance with some embodiments.

FIG. 5 illustrates a flowchart of an example process, in accordance with some embodiments. Example process 500 includes a method for determining a time for a platoonable vehicle to travel on one or more roads, in accordance with various embodiments. While the various steps in the flowchart is presented and described sequentially, one of ordinary skill will appreciate that some or all of the steps can be executed in different orders and some or all of the steps can be executed in parallel. Further, in one or more embodiments of the invention, one or more of the steps can be omitted, repeated, and/or performed in a different order. Accordingly, the specific arrangement of steps shown in FIG. 5 should not be construed as limiting the scope of the invention. In one or more embodiments, the steps of FIG. 5 can be performed by example systems 100, 200, 300, and/or computing system 800.

In step 502, a wireless link between a front vehicle and rear vehicle is established.

In step 504, data from a cruise control system is received at a platooning system. The particular platooning system may be located on a front vehicle, rear vehicle, a NOC, and or a combination thereof. A cruise control system may be one or more of a regular cruise control system, an ACC system, and a PCC system.

In step 506, a platooning system may cause a front vehicle and a rear vehicle to dissolve based on data received by the platooning system from the cruise control system. For example, a signal indicating cruise control should end may be sent to a platooning system and cause the platoon to dissolve (or prevent a platoon from forming). For example, a signal may be generated by a driver pressing a brake pedal.

Figure 6:
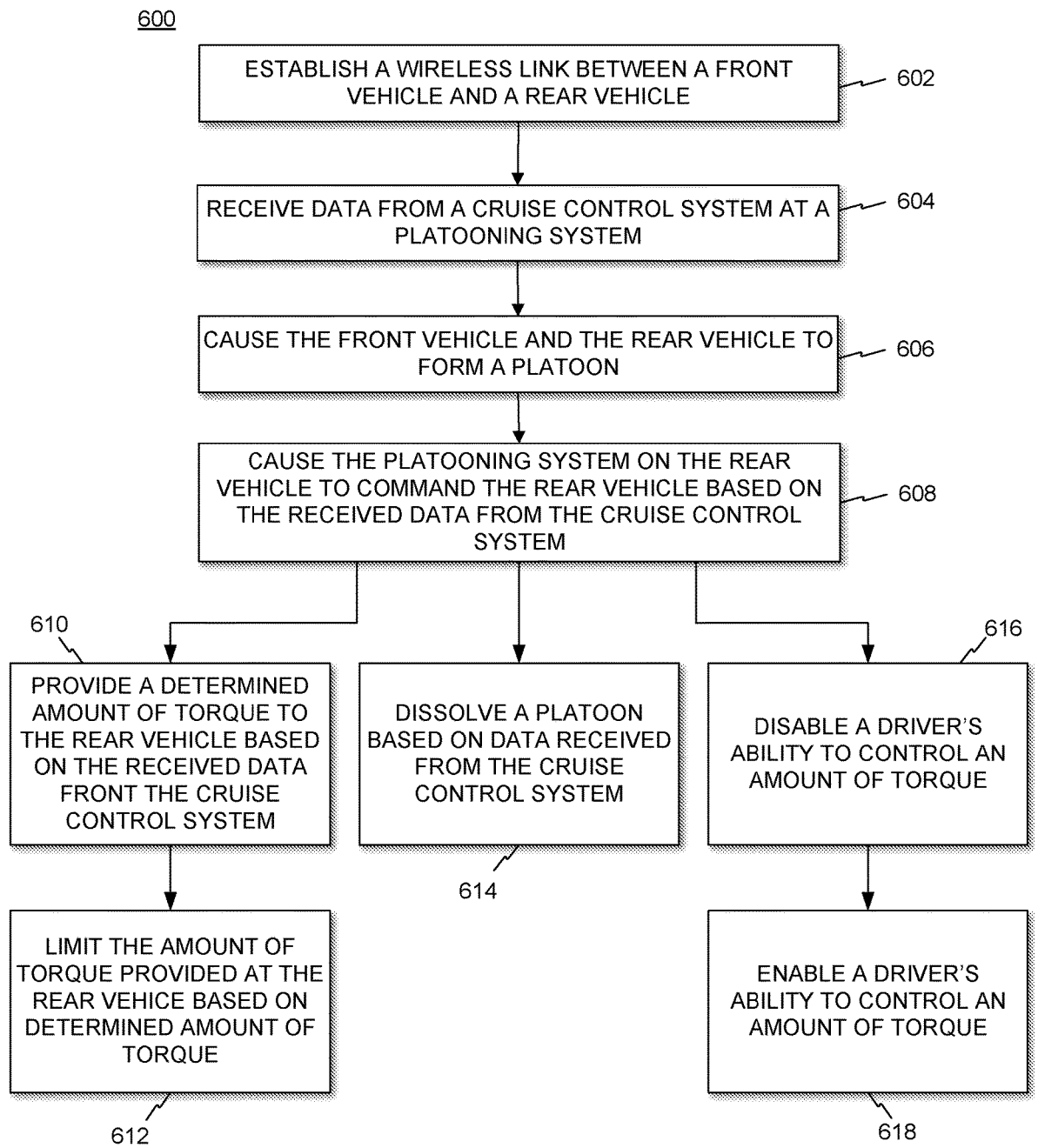

FIG. 6 illustrates a flowchart of an example process, in accordance with some embodiments. Example process 600 includes a method for determining a time for a platoonable vehicle to travel on one or more roads, in accordance with various embodiments. While the various steps in the flowchart is presented and described sequentially, one of ordinary skill will appreciate that some or all of the steps can be executed in different orders and some or all of the steps can be executed in parallel. Further, in one or more embodiments of the invention, one or more of the steps can be omitted, repeated, and/or performed in a different order. Accordingly, the specific arrangement of steps shown in FIG. 6 should not be construed as limiting the scope of the invention. In one or more embodiments, the steps of FIG. 6 can be performed by example systems 100, 200, 300, and/or computing system 800.

In step 602, a wireless link between a front vehicle and rear vehicle is established.

In step 604, data from a cruise control system is received at a platooning system. The particular platooning system may be located on a front vehicle, rear vehicle, a NOC, and or a combination thereof.

In step 606, process 600 causes a rear vehicle and a front vehicle to form a platoon. As described herein, a platoon may begin forming when a rear vehicle encroaches on a front vehicle. While platooning, the front vehicle may control and/or command the torque and/or brakes of the rear vehicle, and/or the rear vehicle may control and/or command the torque and/or brakes of the front vehicle.

In step 608, process 600 causes the platooning system on the rear vehicle to command the rear vehicle based on the received data from the cruise control system.

In step 610, an amount of torque to provide at the rear vehicle is determined based on the received data from the cruise control system.

In step 612, an amount of torque to be provided at the rear vehicle is limited based on the determined amount of torque determined in step 510. In some embodiments, the determined amount of torque is determined at least in part on by the cruise control system. The determined amount of torque may be based on calculations performed by the cruise control system. In some embodiments, the cruise control system may operate normally without accessing the platooning system.

In step 614, the platoon is dissolved based on the received data from the cruise control system. In some embodiments, the received data from the cruise control system indicates a brake pedal has been pressed. In some embodiments, the brake pedal may be in the rear vehicle and/or in the front vehicle.

In step 616, a driver is unable to control an amount of torque in response to the formed platoon (e.g., torque provided by an engine in a front or rear vehicle).

In step 618, the ability to determine an amount of torque is returned to the driver of the rear vehicle. This driver may be in the front truck or rear truck. In other words, either the front truck or the rear truck may cause a platoon to dissolve, wherein the platoon is dissolved based on information provided by the PECU and information provided by the CCECU (e.g., the platooning system and the cruise control system.

Information about a first platoonable vehicle (also referred to first as platoonable vehicle information) and/or a second platoonable vehicle (also referred to as second platoonable vehicle information) may include, but is not limited to: a distance traveled, a distance platooned, a distance/time/location traveled being paired, a distance/time/location traveled not being paired, a distance/time/location traveled while being authorized to platoon, a distance/time/location traveled while not being authorized to platoon, a distance/time/location while platooning, a distance/time/location while not platooning, etc.

This information, and other information about a vehicle that may be used by systems described herein (e.g., to platoon, to provide to a cruise control system, and/or to receive from a cruise control system) may include, but is not limited to a/an: position, latitude, longitude, altitude, heading, speed, longitudinal and lateral acceleration, relative angle, type of load (e.g., type of materials a vehicle is carrying), brake status, brake pressure, path history, path projection, travel plans, vehicle size, vehicle type, brake type, current operating mode (autonomous or manual), map data, traffic information, GPS augmentation information (e.g., delays from infrastructure), wheel speed, wheel torque, gross torque, net torque, wind, rain, music, video, infotainment system, suspension, axle weight(s), transmission status (e.g., what gear the vehicle is in, what gear the vehicle was in, what gears the vehicle transferred from and to (e.g., fifth gear to fourth gear)), previous transmission status, hybrid vehicle drivetrain (e.g., a parallel hybrid or an electric hybrid), electric motor, battery, super charger, electronic throttle control, throttle pedal, brake pedal, power steering, ACC, a blowout, interior lighting, exterior lighting, retarder, anti-lock brakes, emergency braking, engine governor, powertrain, gear ratio, wheel size, wheel type, trailer length, trailer type, trailer height, amount of trailers, trailer position, current trailer position, past trailer position, tractor type, tractor height, transceiver type, current fuel, next determined stop, projected miles remaining until fuel tanks are empty, malfunctions, turn signals, LIDAR, radar, ultrasonic sensors, road surface, wheel angle, tire pressure, tire tread depth, cabin temperature, engine temperature, trailer interior temperature, camera, fleet of vehicles, NOC, computer vision, other vehicle traveling in the same direction, other vehicle traveling in an opposite direction, and intervening traffic (e.g., cut-ins, also referred to as the situation when a vehicle enters an area between a lead vehicle and a rear vehicle). As an example, a platooning system may receive a wheel speed from a cruise control system and/or a BECU. Of course, in some embodiments, a cruise control system may be at least in part included in a BECU.

Figure 7:
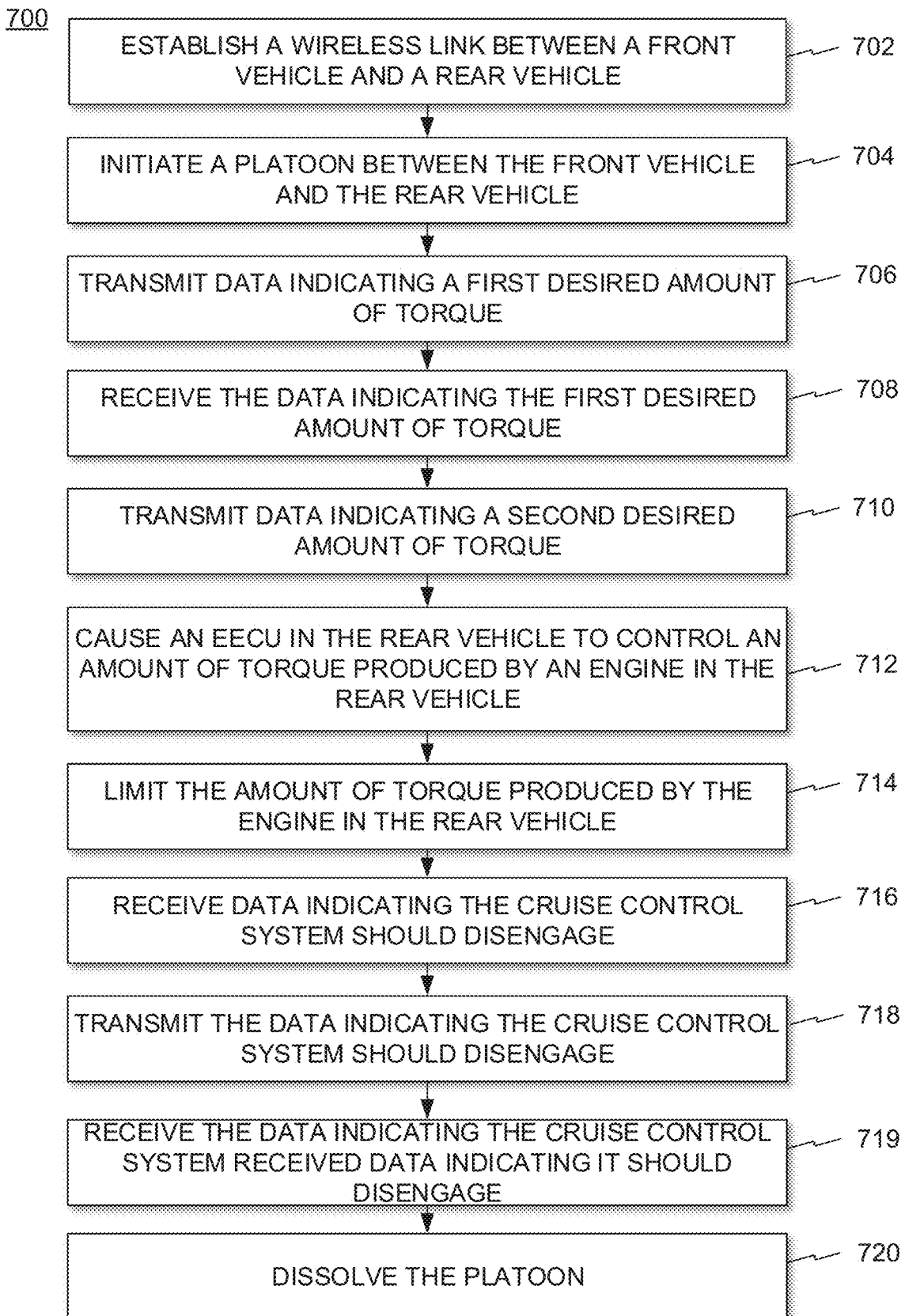
FIG. 7 illustrates an example computing system, in accordance with some embodiments.

FIG. 7 illustrates a flowchart of an example process, in accordance with some embodiments. Example process 700 includes a method for determining a time for a platoonable vehicle to travel on one or more roads, in accordance with various embodiments. While the various steps in the flowchart is presented and described sequentially, one of ordinary skill will appreciate that some or all of the steps can be executed in different orders and some or all of the steps can be executed in parallel. Further, in one or more embodiments of the invention, one or more of the steps can be omitted, repeated, and/or performed in a different order. Accordingly, the specific arrangement of steps shown in FIG. 7 should not be construed as limiting the scope of the invention. In one or more embodiments, the steps of FIG. 7 can be performed by example systems 100, 200, 300, and/or computing system 800.

In step 702, a wireless link is established between a front vehicle and a rear vehicle. For example, a PECU in the front and/or rear vehicle may initiate communication between the front and/or rear vehicle.

In step 704, a platoon is initiated between the front vehicle and the rear vehicle. The platoon may comprise more than two vehicles. In some embodiments, the platoon starts when the rear vehicle draws in toward the front vehicle, substantially maintains a gap (e.g., within 2 meters and/or within 0.2 seconds).

In step 706, data indicating a first amount of desired torque is transmitted from a platooning system to a cruise control system. The platooning system and the cruise control system may be both be located on the rear vehicle, they may be located on the front vehicle, or they may be located on both vehicles (e.g., portions of one or more systems may be located on both vehicles). In some embodiments, each system may operate independently of one another.

In step 708, the data indicating the first desired amount of torque is received by a cruise control system from a platooning system. The desired amount of torque may be dictated by a PECU, and determined based on a desired gap, which may be selected by a remote terminal, and/or sent through a NOC. For example, a desired amount of torque may be based on a desired gap.

In step 710, data indicating a second desired amount of torque is transmitted. This data may be transmitted from a cruise control system to an EECU. In some embodiments, the cruise control system may at least in part be included in the EECU. In some embodiments, the cruise control system may be an AAC system or a PCC system. In some embodiments, the second desired amount of torque may be based at least in part on the data indicating the first desired amount of torque. For example, a PECU may request a first amount of torque. A cruise control system may receive the request. The cruise control system may send a derivative of that request (e.g., a version that an EECU can read) to an EECU. In other words, the second desired amount of torque may be based on the first desired amount of torque, but the data may be different such that the cruise control system can read data it receives and the EECU can read data it receives.

In step 712, the method (e.g., a vehicle system) causes an EECU to control an amount of torque produced by an engine in the rear vehicle. The amount of torque produced by the engine in the rear vehicle may be based on the second desired amount of torque.

For example, a PECU may request an amount of torque. A cruise control system may receive that request, and then request the amount of torque. An EECU may receive that request, and then control and/or command an amount or torque produced by an engine.

In step 714, an amount of torque produced by the engine in the rear vehicle is limited. For example, a request for torque may be made that exceeds the amount of torque required. In some cases, a request for torque may correspond to an amount of speed, but in actuality the torque is really what is needed. In any case, in various embodiments a request for torque is limited by an EECU and/or a cruise control system. In some cases, the cruise control system may at least in part by included in an EECU.

In step 716, data indicating the cruise control system should disengage is received at a cruise control system. This data may be generated at the front vehicle and/or the rear vehicle. Such data may include a system fault (e.g., a fault determined at a BECU, EECU, CCECU, TECU, VECU, PECU, etc.). This data may include pressing a brake pedal on a rear vehicle and/or a front vehicle. Of course, a person skilled in the art would understand that, in some embodiments, data indicating a cruise control system should disengage may refer to data that typically causes an engaged cruise control system to disengage (e.g., when a normal cruise control system is activated and traveling on a road and a driver presses a brake pedal or turns the cruise control off).

In step 718, data indicating the cruise control system should disengage is transmitted from the cruise control system to the platooning system.

In step 719, the platooning system receives the data indicating the cruise control system should disengage.

In step 720, the platoon between the front vehicle and the rear vehicle is dissolved in response to the received data indicating the cruise control system should disengage. In some embodiments, rather than dissolve, a platoon may be prevented from forming. In some embodiments, other vehicles in a platoon may continue to platoon while only one vehicle exists the platoon.

Figure 8:
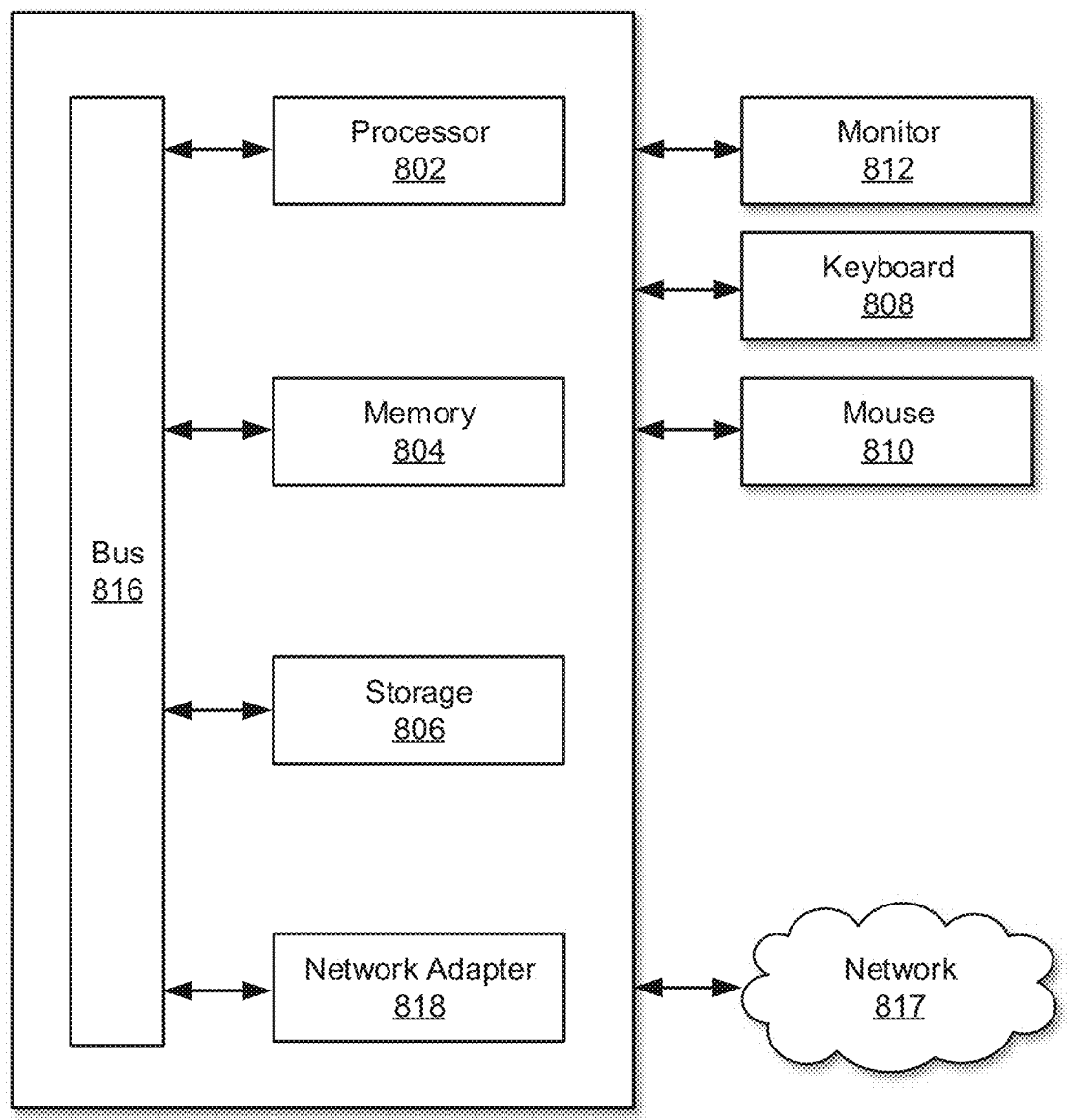
FIG. 8 illustrates an example computing system, in accordance with some embodiments.

FIG. 8 illustrates an example computing system, in accordance with some embodiments.

In various embodiments, the calculations performed above may be discussed in the general context of computer-executable instructions residing on some form of computer-readable storage medium, such as program modules, executed by one or more computers or other devices. By way of example, and not limitation, computer-readable storage media may comprise non-transitory computer-readable storage media and communication media; non-transitory computer-readable media include all computer-readable media except for a transitory, propagating signal. Generally, program modules include routines, programs, objects, components, data structures, etc., that perform particular tasks or implement particular abstract data types. The functionality of the program modules may be combined or distributed as desired in various embodiments.

This disclosure contains numerous references to a NOC and to one or more processors. According to various aspects, each of these items may include various kinds of memory, including non-volatile memory, to store one or more programs containing instructions for performing various aspects disclosed herein.

For example, as shown in FIG. 8, example computing system 800 may include one or more computer processor(s) 802, associated memory 804 (e.g., random access memory (RAM), cache memory, flash memory, read only memory (ROM), electrically erasable programmable ROM (EEPROM), or any other medium that can be used to store the desired information and that can be accessed to retrieve that information, etc.), one or more storage device(s) 806 (e.g., a hard disk, a magnetic storage medium, an optical drive such as a compact disk (CD) drive or digital versatile disk (DVD) drive, a flash memory stick, etc.), bus 816, and numerous other elements and functionalities. The computer processor(s) 802 may be an integrated circuit for processing instructions. For example, the computer processor(s) may be one or more cores or micro-cores of a processor. The computing system 800 may also include one or more input device(s), such as a touchscreen, keyboard 808, mouse 810, microphone, touchpad, electronic pen, or any other type of input device. Further, the computing system 800 may include one or more output device(s), such as a screen (e.g., a liquid crystal display (LCD), a plasma display, touchscreen, cathode ray tube (CRT) monitor 812, projector, or other display device), a printer, external storage, or any other output device. The computing system 1300 may be connected to a network 817 (e.g., a local area network (LAN), a wide area network (WAN) such as the Internet, mobile network, or any other type of network) via a network adapter 818. The input and output device(s) may be locally or remotely connected (e.g., via the network 817) to the computer processor(s) 802, memory 804, and storage device(s) 806.

One or more elements of the aforementioned computing system 800 may be located at a remote location and connected to the other elements over a network 817. Further, embodiments of the invention may be implemented on a distributed system having a plurality of nodes, where each portion of the invention may be located on a subset of nodes within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

For example, one or more of the software modules disclosed herein may be implemented in a cloud computing environment. Cloud computing environments may provide various services and applications via the Internet (e.g., the NOC). These cloud-based services (e.g., software as a service, platform as a service, infrastructure as a service, etc.) may be accessible through a Web browser or other remote interface.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared, and other wireless media. Combinations of any of the above can also be included within the scope of computer-readable media.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment.

While this disclosure has been described in terms of several aspects, there are alterations, modifications, permutations, and equivalents which fall within the scope of this disclosure. In view of the many alternative ways of implementing the methods and apparatuses of the present disclosure, it is intended that the following appended claims be interpreted to include all such alterations, modifications, permutations, and substitute equivalents as falling within the true scope of the present disclosure.

What is claimed:

1. A method for commanding a rear vehicle, comprising:
    establishing a wireless link between a front vehicle and the rear vehicle;
    initiating a platoon between the front vehicle and the rear vehicle via the wireless link;
    transmitting, from a platooning system to a cruise control system, data indicating a first desired amount of torque;
    receiving, at the cruise control system, the data indicating the first desired amount of torque;
    transmitting, from the cruise control system to an engine electronic control unit (EECU) in the rear vehicle, data indicating a second desired amount of torque, wherein the data indicating the second desired amount of torque is based at least in part on the data indicating the first desired amount of torque;

causing the EECU in the rear vehicle to control an amount of torque produced by an engine in the rear vehicle, wherein the amount of torque produced by the engine in the rear vehicle is based on the second desired amount of torque; and dissolving the platoon between the front vehicle and the rear vehicle in response to a platooning electronic control unit determining, at least in part by signals generated at a forward looking radar, that (1) a brake electronic control unit in the rear vehicle, and (2) the cruise control system are not operating correctly, wherein a vehicle electronic control unit also monitors whether the platooning system is operating correctly.

2. The method of claim 1, wherein causing the EECU in the rear vehicle to control the amount of torque produced by the engine in the rear vehicle is based on a desired gap between the front vehicle and the second vehicle while the front vehicle and the rear vehicle are platooning.

3. The method of claim 1, further comprising:
limiting, at the EECU in the rear vehicle, the amount of torque produced by the engine in the rear vehicle.

4. The method of claim 3, wherein the amount of torque produced by the engine in the rear vehicle to limit is determined at least in part by the cruise control system.

5. The method of claim 1, wherein the cruise control system is an adaptive cruise control system.

6. The method of claim 1, wherein the cruise control system is a predictive cruise control system.

7. The method of claim 1, further comprising:
receiving, at the cruise control system, first data indicating the cruise control system should disengage;
transmitting, from the cruise control system to the platooning system, second data indicating the cruise control system received the first data indicating the cruise control system should disengage;
receiving, at the platooning system from the cruise control system, the second data indicating the cruise control system received the first data indicating the cruise control system should disengage; and
dissolving the platoon in response to receiving, at the platooning system, the second data indicating the cruise control system received the first data indicating the cruise control system should disengage.

8. The method of claim 7, wherein the second desired amount of torque is determined by the cruise control system.

9. The method of claim 7, wherein the first data indicating the cruise control system should disengage includes an indication that a brake pedal was pressed.

10. The method of claim 7, wherein the first data indicating the cruise control system should disengage includes an indication that a fault was detected.

11. The method of claim 10, wherein the fault was detected by the brake electronic control unit.

12. A method for platooning, comprising:
causing, at least in part at a platooning electronic control unit (PECU), a platoon to form between a first vehicle and a second vehicle, wherein the PECU establishes a communication link between the first vehicle and the second vehicle; and
dissolving the platoon between the first vehicle and the second vehicle in response to the PECU determining, at least in part by signals generated at a forward looking radar, that (1) a brake electronic control unit in the rear vehicle, (2) a cruise control electronic control unit (CCECU), and (3) an engine electronic control unit (EECU) are not operating correctly.

13. The method of claim 12, wherein the CCECU is included in the engine electronic control unit (EECU).

14. The method of claim 12, further comprising:
receiving, at the CCECU from the PECU, a desired amount of torque; and
requesting, by the CCECU, the desired amount of torque from an engine in the second vehicle.

15. The method of claim 14, wherein the requested desired amount of torque is limited.

16. The method of claim 15, wherein the PECU and the CCECU are remote from one another.

17. A method for transmitting data between a platooning system in a rear vehicle and a cruise control system in the rear vehicle, comprising:
establishing a link between a front vehicle and the rear vehicle;
causing the front vehicle and the rear vehicle to platoon via data transmitted over the link, wherein the data transmitted over the link from the front vehicle to the rear vehicle includes torque information and brake information;
receiving the torque information and the brake information at the platooning system in the rear vehicle;
transmitting information based on the torque information from the platooning system to the cruise control system; and
dissolving the platoon between the front vehicle and the rear vehicle in response to a platooning electronic control unit determining, at least in part by signals generated at a forward looking radar, that (1) a brake electronic control unit in the rear vehicle, and (2) the cruise control system are not operating correctly, wherein a vehicle electronic control unit also monitors whether the platooning system is operating correctly.

* * * * *